May 17, 1932.  H. H. SWIFT  1,859,184

STRAINER

Filed April 21, 1930

Hiram H. Swift,
INVENTOR.

BY Victor J. Evans
ATTORNEY.

Patented May 17, 1932

1,859,184

UNITED STATES PATENT OFFICE

HIRAM H. SWIFT, OF EVANS MILLS, NEW YORK

STRAINER

Application filed April 21, 1930. Serial No. 446,074.

The object of this, my present invention is the provision of a sanitary milk strainer in which the outlet spout projects a suitable distance into the body of the improvement, the said spout having arranged on its inner end a filtering medium such as a wire mesh and which medium is held in place by an apertured cap that is screwed on the spout, the space below the mouth of the spout receiving therein dirt and foreign matters which pass through the pouring spout of ordinary strainers.

To the attainment of the foregoing the invention consists in the improvement hereinafter described and definitely claimed.

Figure 1:
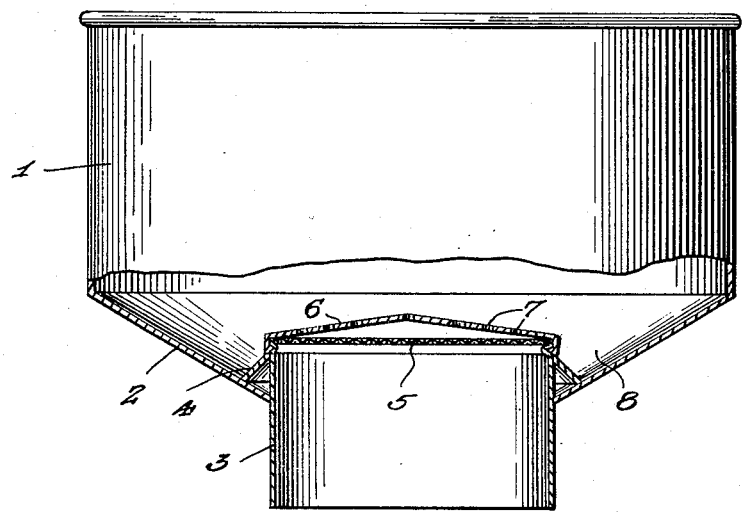
Figure 1 is a side elevation of my improvement with parts broken away and parts in section.
Figure 2:
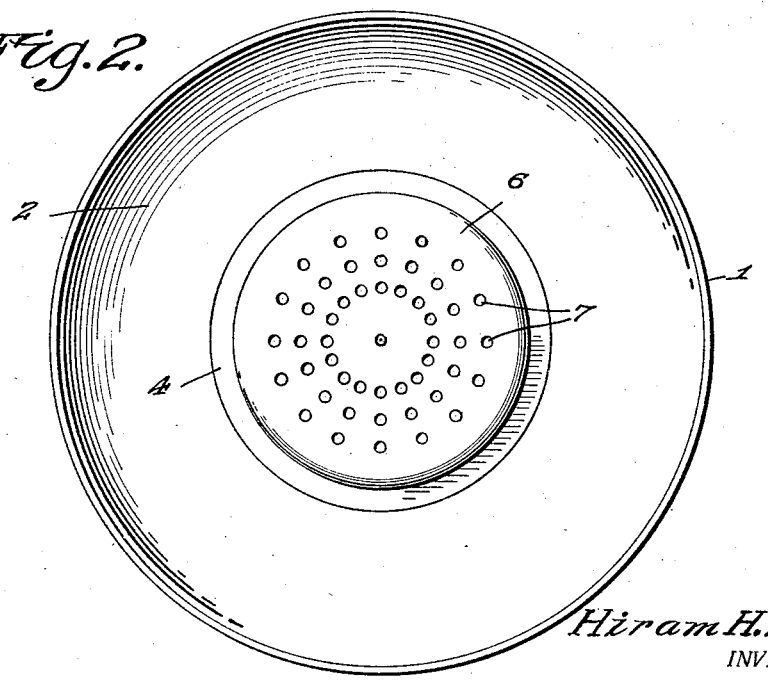
Figure 2 is a top plan view thereof.

Preferably my improvement is constructed of aluminum or some other non-corrosive metal. The improvement includes a bowl 1 which has its sides flared toward its lower end or bottom, as at 2. The wall 2 is centrally provided with a round opening for an outlet spout 3. The outlet spout is in the nature of a short tube and may be integrally formed with the bowl 1. The spout extends a suitable distance into the bowl and there is a flared or angle ring wall 4 between the inner end or top of the spout 3 and the inclined bottom wall 2 of the funnel. The band 4 provides one of the angle bottom walls of the funnel, provides a reinforcement for the spout 3 and a stop element for the flanged cap which will presently be described. The top of the spout is threaded and the said top is designed to be covered by a disc 5 of closely woven wire, the said disc affording the filtering medium. There is fitted on the spout 3 a flanged cap 6. The cap is gradually tapered downwardly from its center to its flanged end, and the said cap is provided with series of circularly arranged apertures 7 through which the milk flows.

The space 8, in the bottom of the can provided between the bottom of the can and the flared or tapered band 4 affords a receptacle for dirt or other impurities which enter the milk prior to its being poured into the bowl 1. The opposite angle walls provided by the band 4 and the flared or tapered bottom 2 of the bowl 1 afford a substantially V-shaped space therebetween, the band serving to direct dirt or foreign matter along the flared wall 2 and away from the spout when the bowl is to be cleaned. These opposite angle walls also afford a means whereby a cleaning cloth can be readily applied therebetween, so that the bottom of the spout can thereby have easily removed therefrom all dirt and the bottom of the spout can be cleaned in an easier and more expeditious manner than with any other construction for the same purpose with which I am acquainted. The spout 3 is of a size to be snugly received in the mouth of the receptacle into which the milk is delivered from the strainer.

It is believed that the foregoing description when read in connection with the accompanying drawings will fully set forth the advantages of the construction to those skilled in the art to which such invention relates and that further detailed description will not be required.

Having described the invention, I claim:

A milk strainer comprising a bowl having an inwardly flared lower portion which merges into a spout that is extended both outwardly and inwardly with respect to the bowl, the inner portion of the spout being threaded, a tapered band arranged between the top of the spout and the bottom of the bowl and secured to both of these members, a mesh disc resting on the top of the spout, a flanged cap fitted on the top of the spout and resting on the flared band, and said cap having a conical top which is provided with series of circularly arranged apertures.

In testimony whereof I affix my signature.

HIRAM H. SWIFT.